United States Patent
Park et al.

(10) Patent No.: US 9,008,637 B2
(45) Date of Patent: Apr. 14, 2015

(54) CALL FORWARDING SYSTEM AND METHOD FOR FORWARDING A CALL TO A TERMINAL THROUGH NEAR-FIELD WIRELESS COMMUNICATION

(71) Applicant: Pantech Co., Ltd., Seoul (KR)

(72) Inventors: Sung June Park, Seoul (KR); Goang Yel Lyu, Gyeonggi-do (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 14/058,968

(22) Filed: Oct. 21, 2013

(65) Prior Publication Data
US 2014/0051414 A1 Feb. 20, 2014

Related U.S. Application Data

(63) Continuation of application No. 13/182,024, filed on Jul. 13, 2011, now Pat. No. 8,583,098.

(30) Foreign Application Priority Data

Jan. 5, 2011 (KR) .......................... 10-2011-0000808

(51) Int. Cl.
*H04W 4/16* (2009.01)
*H04M 1/725* (2006.01)
*H04M 3/54* (2006.01)
*H04W 4/00* (2009.01)
*H04B 5/02* (2006.01)
*H04M 3/42* (2006.01)

(52) U.S. Cl.
CPC .............. *H04W 4/16* (2013.01); *H04M 1/7253* (2013.01); *H04M 3/42348* (2013.01); *H04M 3/54* (2013.01); *H04M 2203/1091* (2013.01); *H04W 4/008* (2013.01); *H04B 5/02* (2013.01)

(58) Field of Classification Search
CPC .......... H04W 4/02; H04W 4/16; H04W 4/008; H04M 1/006; H04M 1/7253; H04M 3/54; H04M 3/541
USPC ............................... 455/414.1, 417, 466, 558
See application file for complete search history.

(56) References Cited

U.S. PATENT DOCUMENTS

2003/0026244 A1* 2/2003 Pietrowicz et al. ........... 370/352
2007/0032225 A1   2/2007 Konicek et al.

OTHER PUBLICATIONS

Non-Final Office Action issued on Dec. 28, 2012 in U.S. Appl. No. 13/182,024. Notice of Allowance issued on Jul. 8, 2013 in U.S. Appl. No. 13/182,024.

* cited by examiner

*Primary Examiner* — Sam Bhattacharya
(74) *Attorney, Agent, or Firm* — H.C. Park & Associates, PLC

(57) ABSTRACT

In a call forwarding system, a management apparatus of the call forwarding system determines service terminals capable of near field wireless communication within a reception range of near field wireless communication, generates a terminal list, and receives a call event message reporting the receipt of a call from a reference terminal. The management apparatus may transmit a call report message including the terminal list to the reference terminal and the service terminals. The management apparatus may forward the call initially received by the reference terminal to a terminal which transmitted a receipt request message by transmitting a call forwarding request message to the reference terminal. The management apparatus may transmit, to the reference terminal and the service terminals, a receipt report message reporting the call was forwarded. According to a change receipt message or upon non-receipt by an intended terminal, the call may be reforwarded to another terminal.

19 Claims, 14 Drawing Sheets

CALL FORWARDING SYSTEM AND METHOD FOR FORWARDING A CALL TO A TERMINAL THROUGH NEAR-FIELD WIRELESS COMMUNICATION

CROSS-REFERENCE TO RELATED APPLICATIONS

This application is a continuation of U.S. patent application Ser. No. 13/182,024, filed on Jul. 13, 2011, now issued as U.S. Pat. No. 8,583,098, and claims priority from and the benefit of Korean Patent Application No. 10-2011-0000808, filed on Jan. 5, 2011, all of which are incorporated by reference for all purposes as if fully set forth herein.

BACKGROUND

1. Field

The following description relates to a call forwarding system and method for forwarding a call to a terminal through near-field wireless communication.

2. Discussion of the Background

A call transfer service enables a subscriber to forward an incoming call received by a home telephone to a mobile terminal or another telephone if the subscriber is unavailable at a particular location.

Conventionally, call transfer services transfer all incoming calls to a predetermined registered phone number, and do not provide various service functions such as selective call transfer. Moreover, the conventional call transfer services cause inconveniences for users and have limitations in transferring an existing call to another terminal.

Accordingly, there is a need for a more convenient call transfer service.

SUMMARY

Exemplary embodiments of the present invention provide a service terminal, reference terminal, and managing apparatus of a call forwarding system using near-field wireless communication, where a call to the reference terminal is forwarded to the service terminal in response to a forwarding message. Exemplary embodiments of the present invention also provide a method for forwarding the call from a reference terminal to a service terminal through near-field wireless communication in response to a forwarding message.

Additional features of the invention will be set forth in the description which follows, and in part will be apparent from the description, or may be learned by practice of the invention.

Exemplary embodiments of the present invention provide a reference terminal to provide a call forwarding service, including a communication unit to receive a call; a near field wireless communication unit to transceive a message including call forwarding information via near field wireless communication, and to forward the call via near field wireless is communication; a reporting unit to transmit a call report message including a terminal list to a first service terminal, the first service terminal included in the terminal list; and a request processing unit to receive a receipt request message via near field wireless communication and to forward the call to the first service terminal in response to the receipt request message.

Exemplary embodiments of the present invention provide a terminal to receive a call forwarding service, including a near field wireless communication unit to transmit and receive a message including call forwarding information via near field wireless communication; a message processing unit to extract call information and a terminal list included in a call report message if the message processing unit receives the call report message including information that a call was received by a reference terminal; and a display control unit to control a display of the call information and the terminal list.

Exemplary embodiments of the present invention provide a call forwarding system, including a reference terminal to transmit, to service terminals, a call report message including a terminal list of the service terminals located within a reception range of near field wireless communication if a call is received, and to forward the call to a first service terminal in response to a receipt request message, via near field wireless communication; and the first service terminal to receive the call report message via near field wireless communication from the reference terminal and to display the terminal list, and to receive the call forwarded by the reference terminal.

Exemplary embodiments of the present invention provide a method for providing a call forwarding service, including receiving a call; determining a first service terminal capable of near field wireless communication and located within a reception range of near field wireless communication; generating a terminal list including information of the service terminal; is transmitting a call report message including the terminal list; forwarding the call to the first service terminal in response to a receipt request message; and transmitting a receipt report message reporting that the call is forwarded to the first service terminal.

Exemplary embodiments of the present invention provide a method for receiving a call forwarding service, including receiving a call report message from a reference terminal, the call report message including information of a receipt of a call; extracting call information and a terminal list included in the call report message; displaying the call information and the terminal list; transmitting, to the reference terminal, a receipt request message including information that a service terminal will receive the call if the service terminal receives a call receiving input; and receiving at the service terminal the call of the reference terminal via near field wireless communication.

Exemplary embodiments of the present invention provide a management apparatus to control a call forwarding service, including a near field wireless communication unit to transmit and receive a message including information of call forwarding to and from a reference terminal and a service terminal via near field wireless communication, and to forward a call via near field wireless communication; a call sensing unit to determine that a call was received by the reference terminal in response to a call event message from the reference terminal; a list generating unit to determine the service terminal capable of near field wireless communication and located within a reception range of the near field wireless communication, and to generate a terminal list including the service terminal; a reporting unit to transmit a call report message including the terminal list to the reference terminal and the service terminal; and a request processing unit to forward the call of the reference terminal to the service terminal in response to a receipt request message, via near field wireless communication, and to transmit a is call forwarding request message to the reference terminal if the request processing unit receives the receipt request message.

Exemplary embodiments of the present invention provide a reference terminal to provide a call forwarding service, including a communication unit to receive a call; a near field wireless communication unit to transmit and to receive a message for call forwarding to and from a management apparatus via near field wireless communication, and to forward the call via near field wireless communication; and a call sensing unit to transmit, to the management apparatus, a call event message reporting that the call was received if the communication unit receives the call; and a call forwarding processing unit to forward the call to a terminal which requested to receive the call, through the management apparatus connected via near field wireless communication, if the call forwarding processing unit receives a call forwarding request message from the management apparatus.

Exemplary embodiments of the present invention provide a terminal to receive a call forwarding service, including a near field wireless communication unit to transmit and to receive a message for call forwarding to and from a management apparatus via near field wireless communication; and a message processing unit to receive a call report message from the management apparatus, and to retrieve call information and a terminal list included in the call report message that a call was received by a reference terminal; and a display unit to display the call information and the terminal list.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
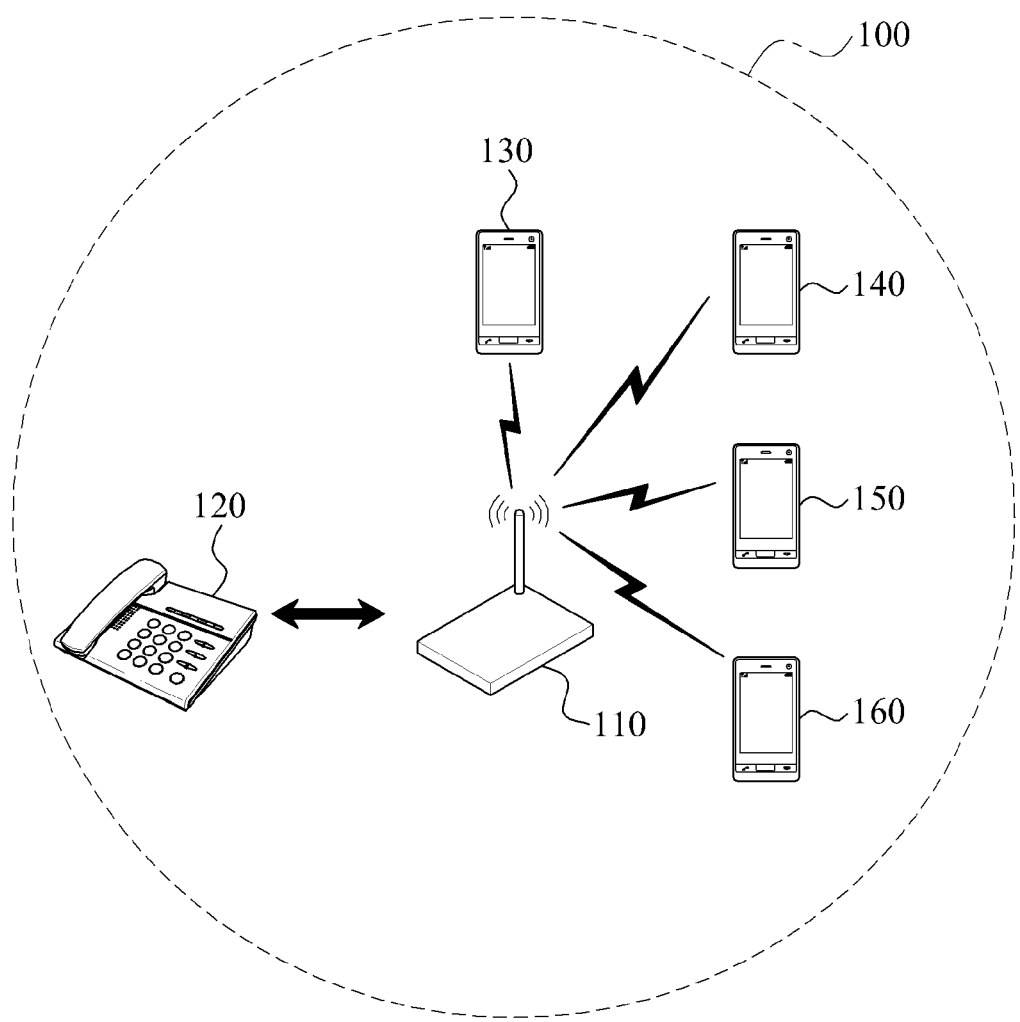
FIG. 1 is a schematic view illustrating a structure of a call forwarding system according to an exemplary embodiment of the present invention.

Exemplary embodiments now will be described more fully hereinafter with reference to the accompanying drawings, in which embodiments of the invention are shown. The present disclosure may, however, be embodied in many different forms and should not be construed as limited to the exemplary embodiments set forth herein. Rather, these exemplary embodiments are provided so that this disclosure is thorough, and will fully convey the scope of is the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

It will be understood that when an element is referred to as being "connected to" another element, it can be directly connected to the other element, or intervening elements may be present.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, is should be interpreted as having a meaning that is consistent with their meaning in the context of the relevant art and the present disclosure, and will not be interpreted in an idealized or overly formal sense unless expressly so defined herein.

Exemplary embodiments of the invention provide a near field wireless communication system and method for reporting a reception of a call signal received by a reference terminal to service terminals via near field wireless communication and for forwarding a corresponding call to a terminal which requests to receive the call.

FIG. 1 is a schematic view illustrating a structure of a call forwarding system according to an exemplary embodiment of the present invention.

As shown in FIG. 1, the call forwarding system 100 may include a management apparatus 110, a reference terminal 120, and service terminals 130, 140, 150, and 160.

The management apparatus 110 may control the process for forwarding a call received by the reference terminal 120 to at least one of the service terminals 130, 140, 150, and 160 capable of near field wireless communication.

The reference terminal 120 may receive a call and provide the call to be forwarded. The reference terminal 120 may be a wired terminal such as a home telephone, or a wireless mobile terminal. In an example, the service terminals 130, 140, 150, and 160 may serve as a reference terminal. Further, the reference terminal 120 may be one of multiple terminals 130, 140, 150, and 160 capable of near field wireless communication with the management apparatus 110 within a reception range of the near field wireless communication.

The service terminals 130, 140, 150, and 160 ("service terminals") may receive a call from the reference terminal 120 through the management apparatus 110, and may provide a call service to a user.

The management apparatus 110, the reference terminal 120, and the service terminals 130, 140, 150, and 160 are described below in more detail with reference to FIG. 2 through FIG. 4.

Figure 2:
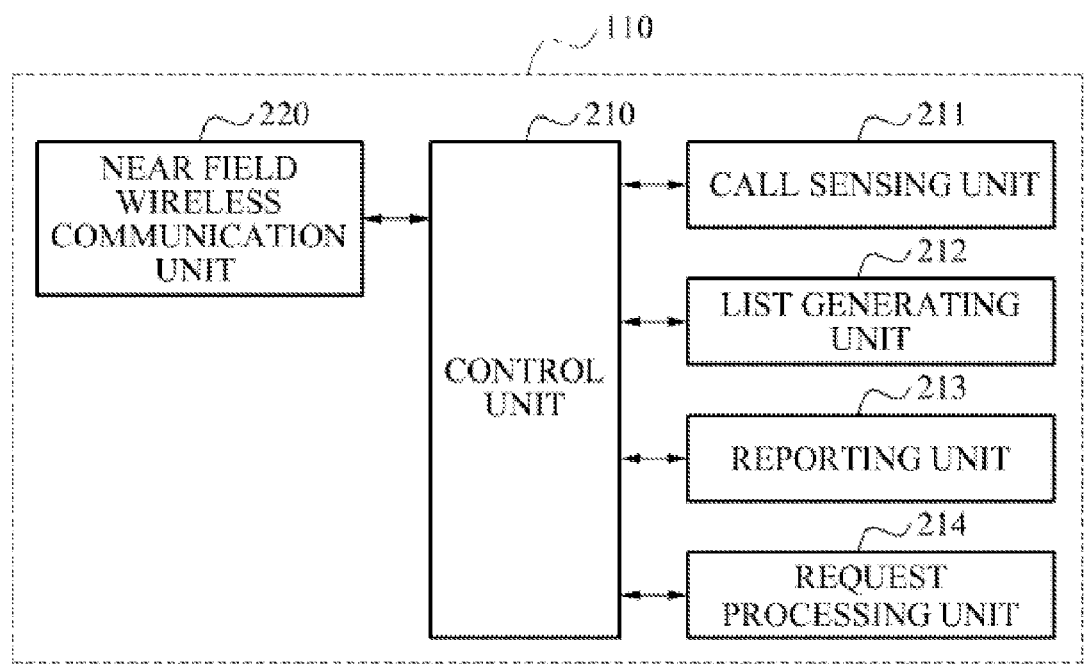
FIG. 2 is a block diagram illustrating a management apparatus to manage a call forwarding service in the call forwarding system according to an exemplary embodiment of the present invention.

FIG. 2 is a block diagram illustrating the management apparatus 110 to manage a call forwarding service in the call forwarding system 100 according to an exemplary embodiment of the present invention.

As shown in FIG. 2, the management apparatus 110 may include a control unit 210, a near field wireless communication unit 220, a call sensing unit 211, a list generating unit 212, a reporting unit 213, and a request processing unit 214.

The near field wireless communication unit 220 may transmit and receive a message including call forwarding information to and from the reference terminal 120 and the service terminals 130, 140, 150, and 160 via near field wireless communication, and may forward a call via near field wireless communication.

The call sensing unit 211 may receive a call event message that includes call reception information from the reference terminal 120. The call event message notifies the management apparatus 110 that a call was received by the reference terminal 120.

The list generating unit 212 may communicate with the service terminals 130, 140, 150, and 160 located within a reception range of near field wireless communication, and may generate a terminal list including available service terminal information with relevant time and service terminal status information.

The reporting unit 213 may transmit a call report message including the terminal list to the reference terminal 120 and/or the service terminals 130, 140, 150, and 160.

The receipt request message is a message transmitted from a service terminal, for is example service terminal 130, to the request processing unit 214 to request call forwarding to the service terminal 130, and the call forwarding request message is a message transmitted from the request processing unit 214 to the reference terminal 120 to request call forwarding. If the request processing unit 214 receives a receipt request message, the request processing unit 214 may control forwarding of a call corresponding to the information included in the receipt request message from the reference terminal 120 to the service terminal 130, which transmitted the receipt request message via near field wireless communication by transmitting a call forwarding request message to the reference terminal 120. If the reference terminal 120 receives the call forwarding request message from the request processing unit 214, the reference terminal 120 may forward the call to the service terminal 130 which requested the call forwarding directly or through the request processing unit 214 according to the call forwarding request message. If the request processing unit 214 forwards the call initially received by the reference terminal 120 to the service terminal 130 which transmitted the receipt request message, the reporting unit 213 may transmit, to the reference terminal 120 and the service terminals 130, 140, 150, and 160, a receipt report message including information of the service terminal 130 to which the call was forwarded.

If the request processing unit 214 receives a receipt designation message before receiving the receipt request message, the request processing unit 214 may determine a terminal which transmitted the receipt designation message as a receipt commanding terminal, and may determine a call receiving terminal (or a "target terminal"), to which the call is to be forwarded, by retrieving information of the call receiving terminal included in the receipt designation message. Then, the reporting unit 213 may transmit, to the reference terminal 120 and the service terminals 130, 140, 150, and 160, a receipt designation report message including information of is the receipt commanding terminal and information of the call receiving terminal.

In an example, the reference terminal 120 or one of the service terminals 130, 140, 150, and 160 may transmit the receipt designation message to the request processing unit 214. If the request processing unit 214 receives more than two receipt designation messages from different terminals, the reporting unit 213 may transmit, to the terminals designated as a receipt commanding terminal or a call receiving terminal, a receipt designation confirmation message including each receipt commanding terminal and corresponding call receiving terminal. After comparing more than two receipt designations, terminals which receive the receipt designation confirmation message may transmit a receipt redesignation message including new receipt commanding terminal and call receiving terminal. The request processing unit 214 may determine finalized receipt commanding terminal and call receiving terminal based on the receipt redesignation messages.

In another example, the request processing unit 214 may determine a finalized receipt commanding terminal and a finalized call receiving terminal based on a result of an analysis. Hereinafter, exemplary embodiments of the analysis will be described. If mobile terminal A transmits a receipt designation message including a call receipt terminal as C and mobile terminal B transmits a receipt designation message including a call receipt terminal as B itself, then the request processing unit 214 may create a list of receipt designation information as shown in first two rows in Table 1.

TABLE 1

| Receipt commanding terminal | Call receiving terminal (Target terminal) |
|---|---|
| A | C |
| B | B |
| C | D |
| D | E |
| E | E |

With reference to Table 1, the request processing unit 214 may exclude A, C and D as a finalized call receiving terminal because A, C, and D do not designated themselves as a call receiving terminal. Thus, the remaining candidates of the finalized call receiving terminal is are B and E. The request processing unit 214 may determine E as the finalized call receiving terminal because the number of designation for E as the call receiving terminal is more than that for B. Further, the request processing unit 214 may determine D and E, direct designators, as the finalized receipt commanding terminals or A, C, D and E, both indirect and direct designators, as the finalized receipt commanding terminals.

TABLE 2

| Receipt commanding terminal | Call receiving terminal (Target terminal) |
|---|---|
| A | B |
| B | C |
| C | D |
| D | C |
| E | A |

With reference to Table 2, if all of the available terminals (A through E) are excluded by designating other terminal as a call receiving terminal, the request processing unit 214 may determine C as a finalized call receiving terminal because the number of designation for C as the call receiving terminal is more than that for the other terminals. Further, the request processing unit 214 may determine B and D, direct designators, as the finalized receipt commanding terminals or A, B, C, D and E, both indirect and direct designators, as the finalized receipt commanding terminals.

TABLE 3

| Receipt commanding terminal | Call receiving terminal (Target terminal) |
|---|---|
| A | B |
| B | C |
| C | D |
| D | E |
| E | A |

As shown in Table 3, if designation is circular, the request processing unit 214 may determine 'ALL' (or 'A, B, C, D, E') as a finalized call receiving terminal and determine 'ALL' (or 'A, B, C, D, E') as a finalized receipt commanding terminal.

After the call of the reference terminal 120 is forwarded to the service terminal 130 which transmitted the receipt request message, if the request processing unit 214 receives a receipt change message from the terminal to which the call was forwarded, the request is processing unit 214 may determine a changed call receiving terminal to which the call is to be received, by retrieving information of the changed call receiving terminal included in the receipt change message. Then, the request processing unit 214 may transmit a change request message requesting the reception of the call to the changed call receiving terminal.

If the request processing unit 214 receives a change response message from the changed call receiving terminal, the request processing unit 214 may forward the call to the changed call receiving terminal. Then, the reporting unit 213 may transmit, to the reference terminal 120 and the service terminals 130, 140, 150, and 160, a change report message reporting that the receipt of the call was changed. This change is referred to herein as "reforwarding" and is described in more detail below.

The control unit 210 may control the entire operation of the management apparatus 110. Also, the control unit 210 may perform functions of the call sensing unit 211, the list generating unit 212, the reporting unit 213, and the request processing unit 214. The present embodiment separately describes functions of the control unit 210, the call sensing unit 211, the list generating unit 212, the reporting unit 213, and the request processing unit 214. Alternatively, the control unit 110 may include at least one processor configured to perform a is portion of or all the functions of one or more of the call sensing unit 211, the list generating unit 212, the reporting unit 213, and the request processing unit 214.

Figure 3:
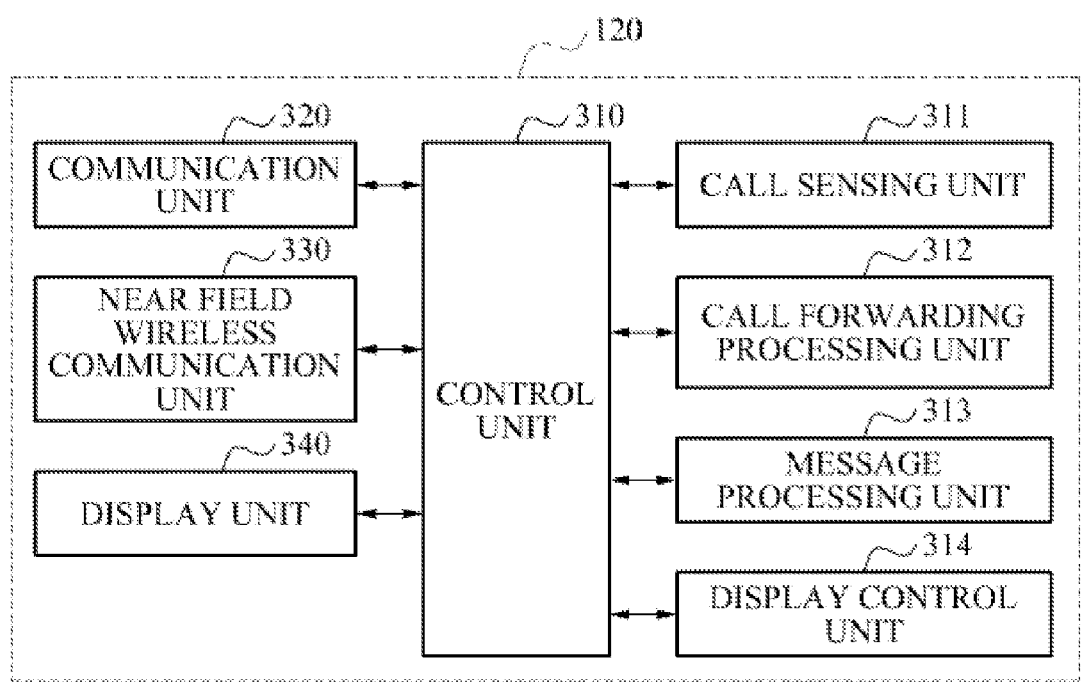
FIG. 3 is a block diagram illustrating a reference terminal to provide a call forwarding service in the call forwarding system according to an exemplary embodiment of the present invention.

FIG. 3 is a block diagram illustrating the reference terminal 120 to provide a call forwarding service in the call forwarding system 100 according to an exemplary embodiment of the present invention.

The reference terminal 120 may be a home telephone capable of wired and/or wireless communication, and may be one of service terminals ready for near field wireless communication in a reception range of near field wireless communication.

Referring to FIG. 3, the reference terminal 120 may include a control unit 310, a communication unit 320, a near field wireless communication unit 330, a display unit 340, a call sensing unit 311, a call forwarding processing unit 312, a message processing unit 313, and a display control unit 314.

The communication unit 320 may initially receive a call from a wired or a wireless telephone service provider.

The near field wireless communication unit 330 may transmit and receive a message including call forwarding information to and from the management apparatus 110 via near field wireless communication, and may forward a call via near field wireless communication.

The display unit 340 may display state information or an indicator, including predetermined numbers and characters, a moving picture, and a still picture that may occur during operation of the reference terminal 120. Also, the display unit 340 may output call forwarding information occurring during call forwarding in response to the control of the display control unit 314.

If the communication unit 320 receives a call, the call sensing unit 311 may transmit a call event message reporting the receipt of the call to the management apparatus 110.

If the call forwarding processing unit 312 receives a call forwarding request message from the management apparatus 110, the call forwarding processing unit 312 may provide the call to a service terminal (in this example, service terminal 130), which requested to receive the call, through the management apparatus 110 connected via near field wireless communication.

The message processing unit 313 may retrieve information included in a message that the reference terminal 120 receives from the management apparatus 110.

If the message processing unit 313 receives a call report message from the management apparatus 110, the message processing unit 313 may extract a terminal list included in the call report message.

If the message processing unit 313 receives a receipt report message from the management apparatus 110, the message processing unit 313 may extract information of the service terminal 130 which received the forwarded call.

If the message processing unit 313 receives a change report message from the management apparatus 110, the message processing unit 313 may extract information of the service terminal 130 which received the reforwarded call. The term "reforwarded" is explained in more detail below.

If the message processing unit 313 receives a receipt designation report message from the management apparatus 110, the message processing unit 313 may extract information of a receipt commanding terminal and information of a call receiving terminal included in the receipt designation report message.

The display control unit 314 may control the display unit 340 to display information extracted by the message processing unit 132.

The control unit 310 may control the entire operation of the reference terminal 120. Also, the control unit 310 may perform functions of the call sensing unit 311, the call forwarding processing unit 312, the message processing unit 313, and the display control unit 314. The present embodiment separately describes functions of the control unit 310, the call sensing unit 311, the call forwarding processing unit 312, the message processing unit 313, and the display control unit 314. Alternatively, the control unit 310 may include at least one processor configured to perform a portion of or all functions of one or more of the call sensing unit 311, the call forwarding processing unit 312, the message processing unit 313, and the display control unit 314.

Figure 4:
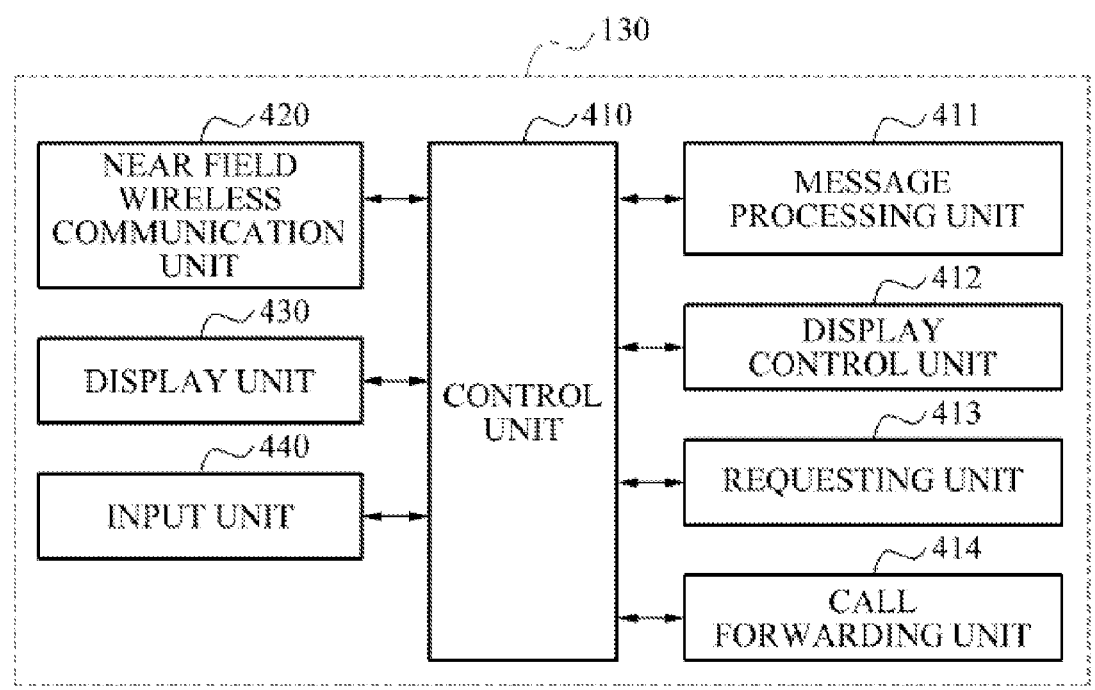
FIG. 4 is a block diagram illustrating a service terminal to receive a call forwarding service in the call forwarding system according to an exemplary embodiment of the present invention.

FIG. 4 is a block diagram illustrating the service terminal 130 to receive a call forwarding service in the call forwarding system 100 according to an exemplary embodiment of the present invention.

As shown in FIG. 4, the service terminal 130 may include a control unit 410, a near field wireless communication unit 420, a display unit 430, an input unit 440, a message processing unit 411, a display control unit 412, a requesting unit 413, and a call forwarding unit 414.

The near field wireless communication unit 420 may transmit and receive a message including call forwarding information to and from the management apparatus 110 via near field wireless communication and may receive a call via near field wireless communication.

The display unit 430 may display state information or an indicator, including predetermined numbers and characters, a moving picture, and a still picture that may occur during operation of the service terminal 130. The display unit 430 may output information occurring during call forwarding in response to the control of the display control unit 412.

The input unit 440 may receive an input of a user of the service terminal 130 and may provide the input to the control unit 410. The input unit 440 may be configured in a device type of a key pad or a touch screen. The input unit 440 may receive various types of inputs such as a call receipt commanding input, a call receiving input, and a call receiving terminal changing input.

The message processing unit 411 may extract information included in messages received from the management apparatus 110.

If the message processing unit 411 receives a call report message from the management apparatus 110, the message processing unit 411 may extract a terminal list included in the call report message.

If the message processing unit 411 receives a receipt report message from the management apparatus 110, the message processing unit 411 may extract information of a terminal which received the forwarded call.

If the message processing unit 411 receives a change report message from the management apparatus 110, the message processing unit 411 may extract information of a terminal which received the reforwarded (as explained in more detail below) call changed in receipt.

If the message processing unit 411 receives a receipt designation report message from the management apparatus 110, the message processing unit 411 may extract information of a receipt commanding terminal and information of a call receiving terminal included in the receipt designation report message.

The display control unit 412 may control the display unit 430 to display information extracted by the message processing unit 411.

The requesting unit 413 may transmit, to the management apparatus 110, a request corresponding to an input inputted into the input unit 440.

If the input unit 440 determines an input as a call receipt commanding input, the requesting unit 413 may extract information of a call receiving terminal to which the call is to be received, and may transmit a receipt designation message including the information of the call receiving terminal to the management apparatus 110.

If the input unit 440 determines an input as a call receiving input, the requesting unit 413 may transmit, to the management apparatus 110, a receipt request message reporting that the service terminal 130 will receive the call.

After the requesting unit 413 transmits the receipt request message to the management apparatus 110, the call forwarding unit 414 may receive the call initially received by the reference terminal through the management apparatus 110 via near field wireless communication.

After the call is forwarded, if the input unit 440 receives and determines an input as a call receiving terminal changing input, the requesting unit 413 may extract information of a changed call receiving terminal, to which the call is to be received ("reforwarded"), and may transmit, to the management apparatus 110, a receipt change message including the information of the changed call receiving terminal. As described herein, the "reforwarded" call is a call for which the forwarding recipient is changed, such as according to a receipt change message sent by any one of the terminals in the near field wireless communication range, or according to a non-receipt by an intended call receiving terminal. A call may be reforwarded more than once, is according to the conditions described above, or according to a preprogrammed sequence.

The control unit 410 may control the entire operation of the service terminal 130. Also, the control unit 410 may perform functions of the message processing unit 411, the display control unit 412, the requesting unit 413, and the call forwarding unit 414. The present embodiment separately describes functions of the control unit 410, the message processing unit 411, the display control unit 412, the requesting unit 413, and the call forwarding unit 414. Alternatively, the control unit 410 may include at least one processor configured to perform a portion of or all functions of one or more of the message processing unit 411, the display control unit 412, the requesting unit 413, and the call forwarding unit 414.

Hereinafter, an exemplary embodiment of a method for forwarding a call to a service terminal connected via near field wireless communication in the call forwarding system 100 is described below with reference to FIG. 5.

Figure 5:
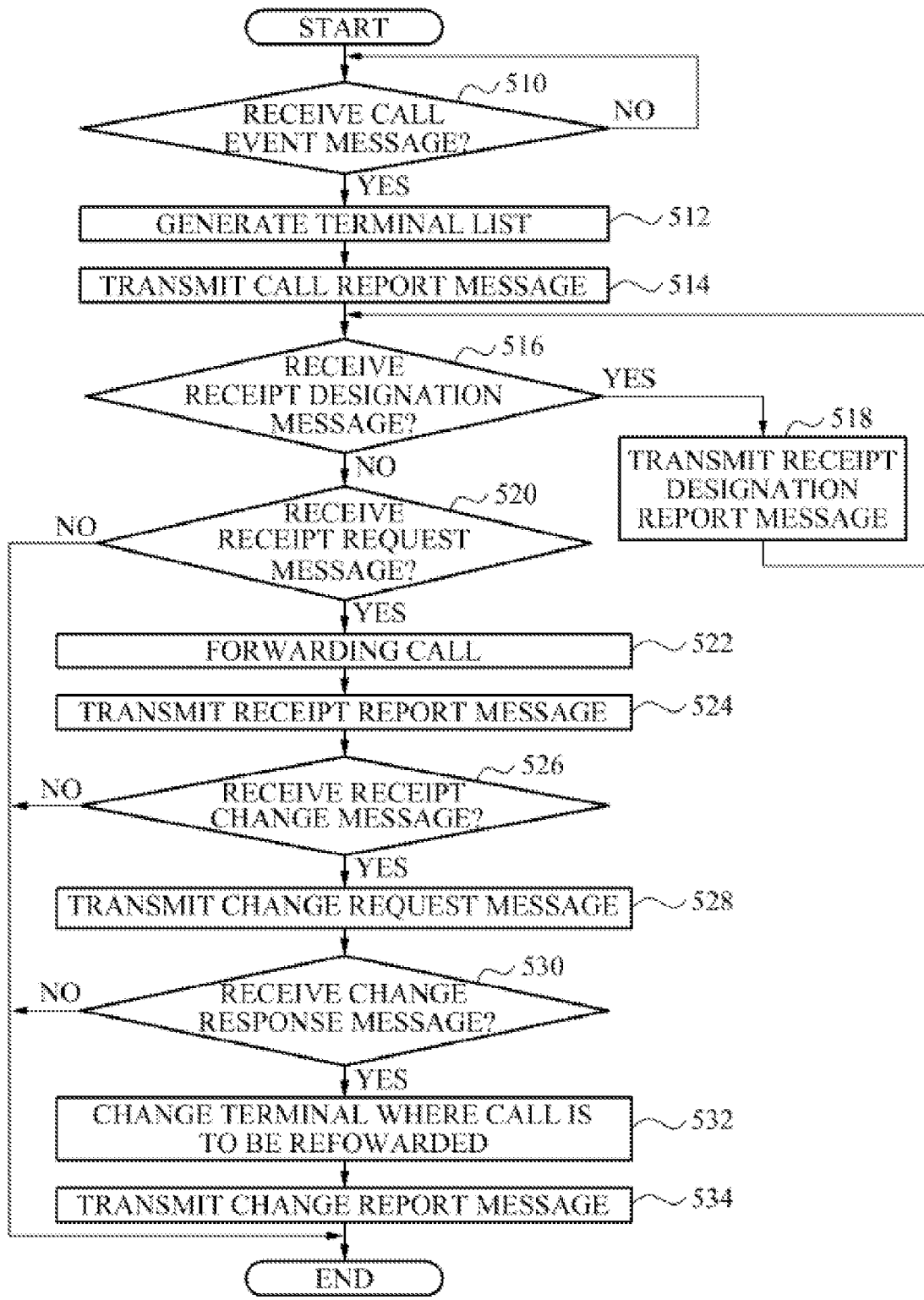
FIG. 5 is a flowchart illustrating a process for managing a call forwarding service in the management apparatus of the call forwarding system according to an exemplary embodiment of the present invention.

FIG. 5 is a flowchart illustrating a process for managing a call forwarding service in the management apparatus 110 of the call forwarding system 100 according to an exemplary embodiment of the present invention. FIG. 5 will be described according to the process performed by the call forwarding system 100 shown in FIG. 1. However, FIG. 5 is not limited as such.

Referring to FIG. 5, if the management apparatus 110 receives a call event message reporting that a call was received by the reference terminal 120 in operation 510, the management apparatus 110 may confirm the service terminals 130, 140, 150, and 160 capable of communication via near field wireless communication within a reception range of near field wireless communication, and may generate a terminal list, in operation 512.

In operation 514, the management apparatus 110 may transmit a call report is message including the terminal list to the reference terminal 120 and the service terminals 130, 140, 150, and 160.

If the management apparatus 110 receives a receipt designation message in operation 516, the management apparatus 110 may extract information of a receipt commanding terminal and information of a call receiving terminal, and may transmit, to the reference terminal 120 and the service terminals 130, 140, 150, and 160, the receipt designation report message including the information of the receipt commanding terminal and the information of the call receiving terminal, in operation 518. After the management apparatus 110 transmits the receipt designation report message, the management apparatus 110 may wait to receive another receipt designation message.

If the management apparatus 110 receives a receipt request message in operation 520, the management apparatus 110 may control the forwarding of the call initially received by the reference terminal 120 to a service terminal 130 which transmitted the receipt request message by transmitting a call forwarding request message to the reference terminal, in operation 522.

In operation 524, the management apparatus 110 may transmit, to the reference terminal 120 and the service terminals 130, 140, 150, and 160, a receipt report message reporting the receipt of the call.

After the call is forwarded, if the management apparatus 110 receives a receipt change message in operation 526 from the service terminal 130 to which the call was forwarded, the management apparatus 110 may determine a changed call receiving terminal 140 to which the call is to be received ("reforwarded"), and may transmit, to the changed call receiving terminal, a change request message requesting the receipt of the reforwarding call, in operation 528.

If the management apparatus 110 receives a change response message from the changed call receiving terminal in operation 530, the management apparatus 110 may reforward the call to the changed call receiving terminal in operation 532.

In operation 534, the management apparatus 110 may transmit, to the reference terminal 120 and the service terminals 130, 140, 150, and 160, a change report message reporting that the receipt of the call was changed.

Figure 6:
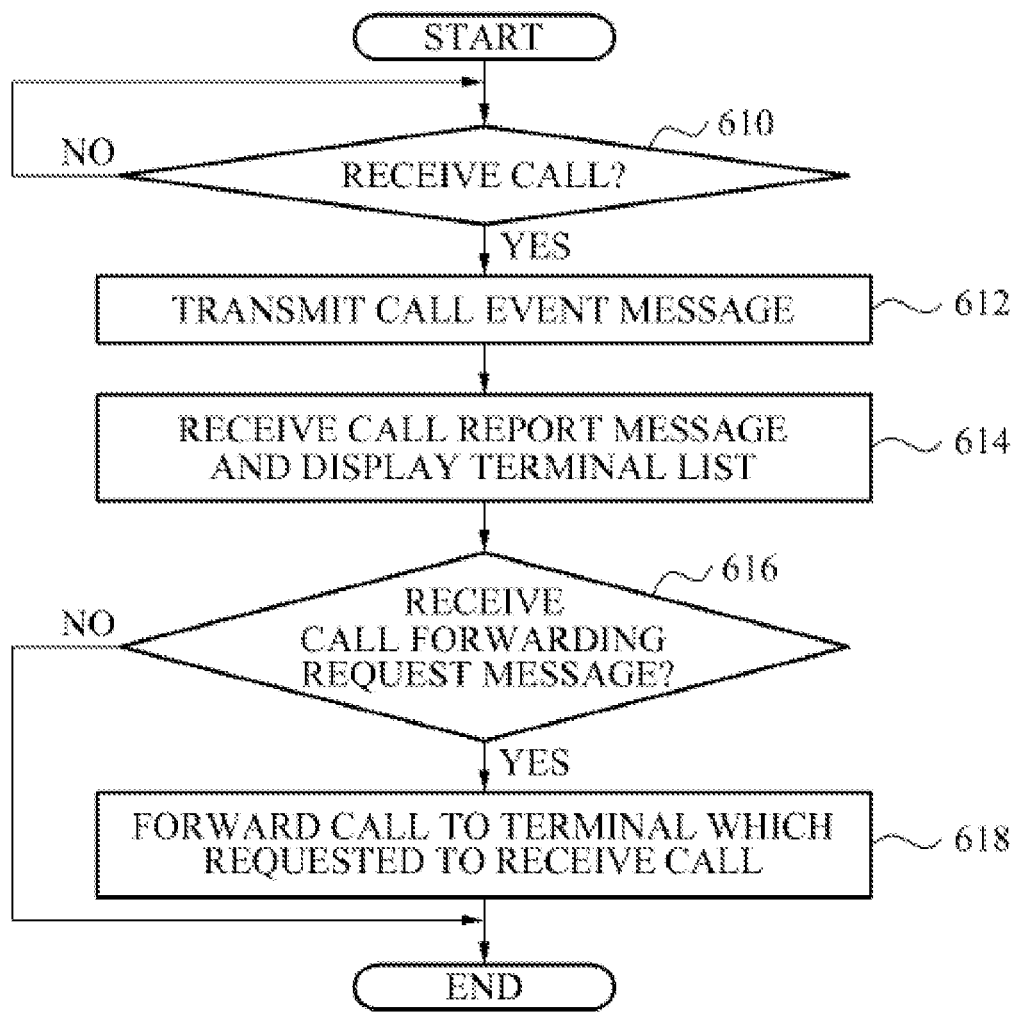
FIG. 6 is a flowchart illustrating a process for providing a call forwarding service in the reference terminal of the call forwarding system according to an exemplary embodiment of the present invention.

FIG. 6 is a flowchart illustrating a process for providing a call forwarding service in the reference terminal 120 of the call forwarding system 100 according to an exemplary embodiment of the present invention. FIG. 6 will be described according to the process performed by the call forwarding system 100 shown in FIG. 1. However, FIG. 6 is not limited as such.

Referring to FIG. 6, if the reference terminal 120 receives a call in operation 610, the reference terminal 120 may transmit, to the management apparatus 110, a call event message reporting that the call was received by the reference terminal 120, in operation 612.

In operation 614, the reference terminal 120 may receive a call report message from the management apparatus 110 and may display a terminal list included in the call report message.

If the reference terminal 120 receives a call forwarding request message from the management apparatus 110 in operation 616, the reference terminal 120 may forward the call to a service terminal 130 which requested to receive the call through the management apparatus 110, in operation 618.

Figure 7:
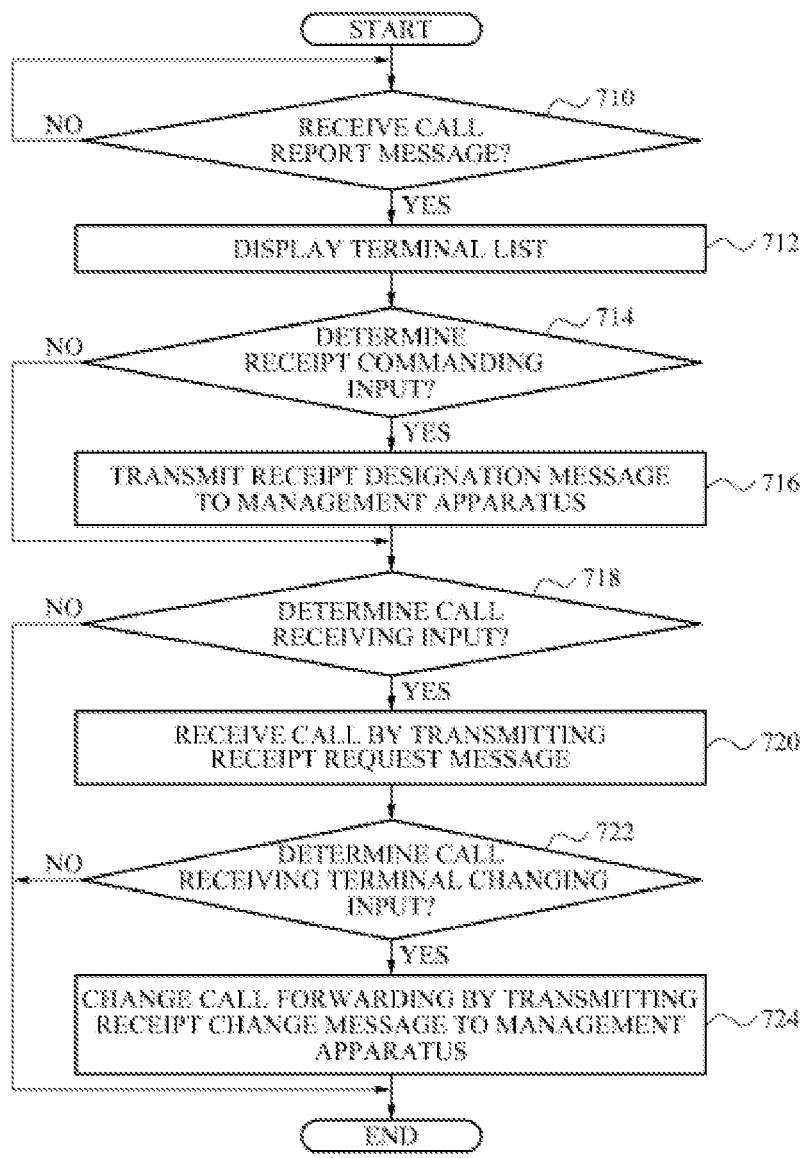
FIG. 7 is a flowchart illustrating a process for receiving a call forwarding service is in the service terminal of the call forwarding system according to an exemplary embodiment of the present invention.

FIG. 7 is a flowchart illustrating a process for receiving a call forwarding service is in the service terminal 130 of the call forwarding system 100 according to an exemplary embodiment of the present invention. FIG. 7 will be described according to the process performed by the call forwarding system 100 shown in FIG. 1. However, FIG. 7 is not limited as such.

Referring to FIG. 7, if the service terminal 130 receives, from the management apparatus 110, a call report message reporting that a call was received in the reference terminal 120, in operation 710, the service terminal 130 may extract and display call information and a terminal list included in the call report message in operation 712.

If the service terminal 130 receives an input and determines the input as a call receipt commanding input in operation 714, the service terminal 130 may extract the inputted information of a call receiving terminal to which the call is to be received, and transmit a receipt designation message including the information of the call receiving terminal to the management apparatus 110, in operation 716.

If the service terminal 130 receives an input and determines the input as a call receiving input in operation 718, the service terminal 130 may wait to receive the call of the reference terminal 120 through the management apparatus 110 via near field wireless communication by transmitting, to the management apparatus 110, a receipt request message reporting that the service terminal 130 will receive the call, in operation 720.

After the call is forwarded, if the service terminal 130 receives an input and determines the input as a call receiving terminal changing input in operation 722, the service terminal 130 may extract information of a changed call receiving terminal representing a terminal to which the call is to be received ("reforwarded"), and may transmit a receipt change message including information of the changed call receiving terminal to the management is apparatus 110, in operation 724.

If the service terminal 130 receives a receipt report message from the management apparatus 110, the service terminal 130 may display information of a terminal which received the call.

If the service terminal 130 receives a change report message from the management apparatus 110, the service terminal 130 may display information of a terminal which received the call changed in receipt ("the reforwarded call").

If the service terminal 130 receives a receipt designation report message from the management apparatus 110, the service terminal 130 may display information of a receipt commanding terminal and information of a call receiving terminal included in the receipt designation report message.

Hereinafter, specific embodiments of the call forwarding system 100 are described below with reference to FIG. 8 through FIG. 11. FIG. 8 through FIG. 11 illustrate a call forwarding service displayed on the 'me' terminal. In these examples, a home telephone is a reference terminal, and the 'father' terminal, the 'mother' terminal, the 'sister' terminal, and the 'me' terminal are service terminals located within a reception range of near-field wireless communication. FIG. 8 through FIG. 11 will be described according to the process performed by the call forwarding system 100 shown in FIG. 1. However, FIG. 8 through FIG. 11 not limited as such.

Figure 8:
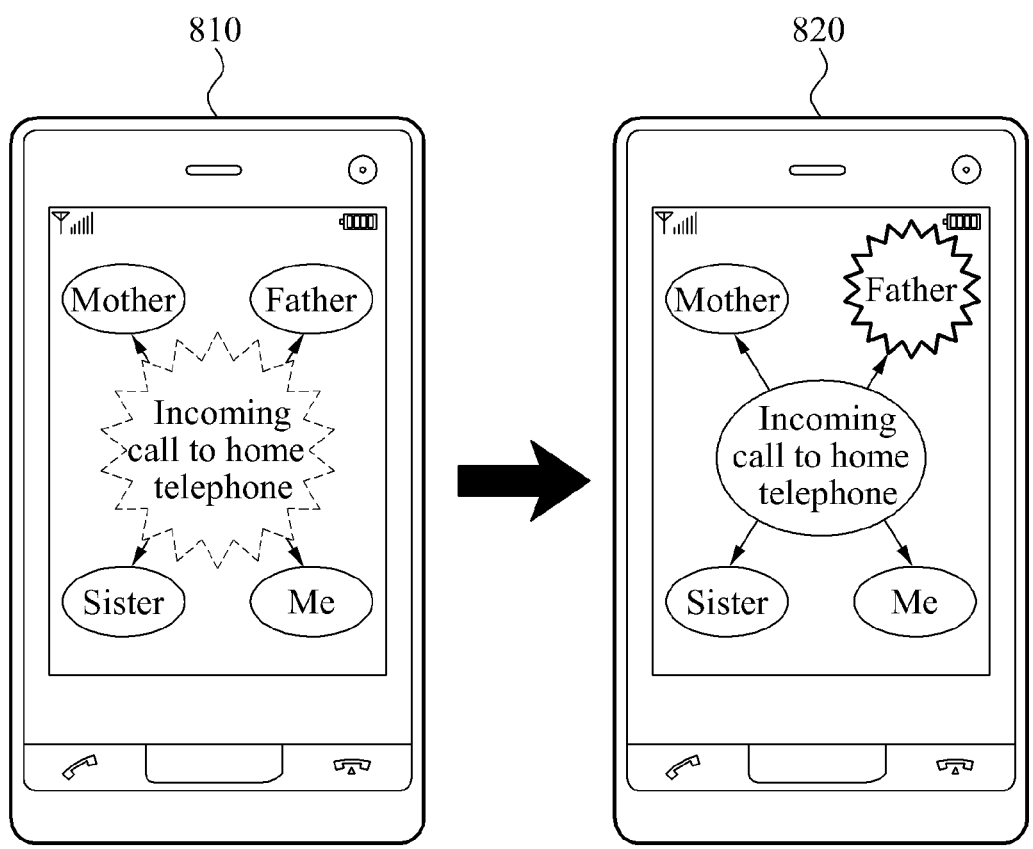
FIG. 8 is a view illustrating an example of call forwarding in the call forwarding system according to an exemplary embodiment of the present invention.

FIG. 8 is a view illustrating an example of call forwarding in the call forwarding system 100 according to an exemplary embodiment of the present invention.

Referring to FIG. 8, if the 'me' terminal receives a call report message from a management apparatus 110, the 'me' terminal may output that a call was received in the is reference terminal, the home telephone, along with a terminal list, in operation 810.

If the 'me' terminal receives a receipt report message reporting that the 'father' terminal received the call, the 'me' terminal may display that the call was received in the 'father' terminal, in operation 820.

Figure 9:
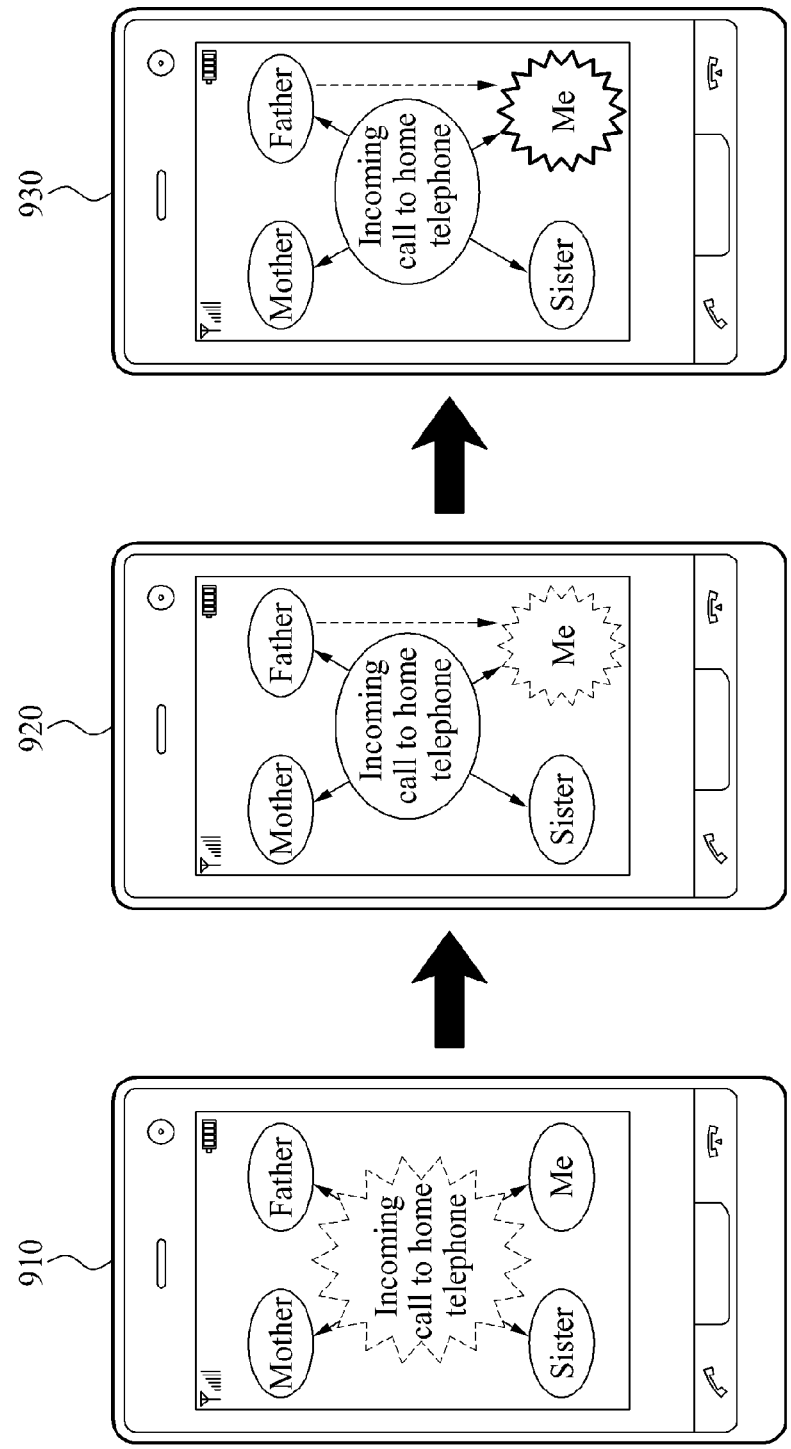
FIG. 9 is a view illustrating an example of call forwarding in the call forwarding system according to an exemplary embodiment of the present invention.

FIG. 9 is a view illustrating an example of call forwarding in the call forwarding system 100 according to an exemplary embodiment of the present invention.

Referring to FIG. 9, if the 'me' terminal receives a call report message from the management apparatus 110, the 'me' terminal may output that a call was received in the reference terminal, the home telephone, along with a terminal list, in operation 910.

If the 'me' terminal receives, from the management apparatus 110, a receipt designation report message reporting that a receipt commanding terminal is the 'father' terminal and a call receiving terminal is the 'me' terminal, the 'me' terminal may display that the 'father' terminal commands the 'me' terminal to receive the call, in operation 920.

If the 'me' terminal receives an input and determines the input as a call receiving input, the 'me' terminal may receive the call through the management apparatus 110 and may display that the call was received in the 'me' terminal, in operation 930.

Figure 10:
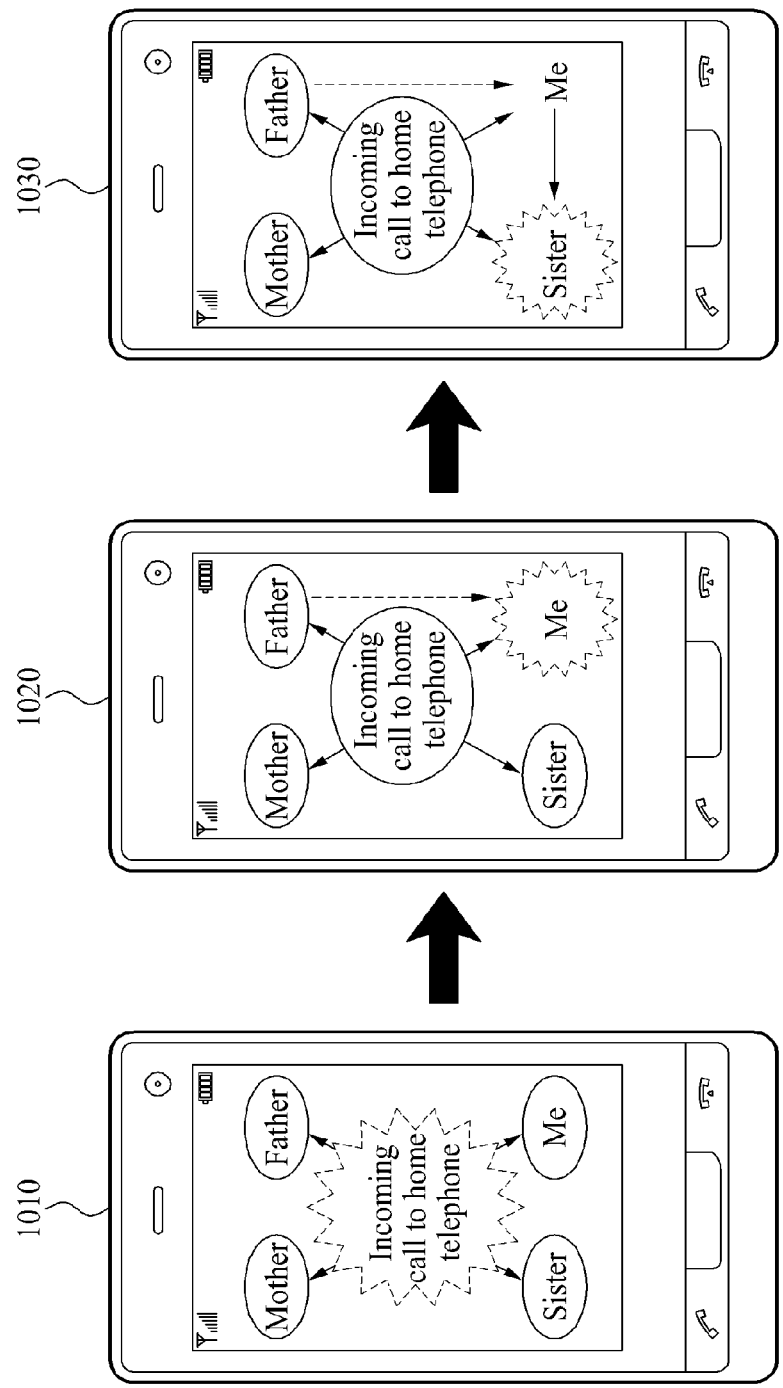
FIG. 10 is a view illustrating an example of call forwarding in the call forwarding system according to an exemplary embodiment of the present invention.

FIG. 10 is a view illustrating an example of call forwarding in the call forwarding system 100 according to an exemplary embodiment of the present invention.

Referring to FIG. 10, if the 'me' terminal receives a call report message from the management apparatus 110, the 'me' terminal may output that a call was received in the reference terminal, the home telephone, along with a terminal list, in operation 1010.

If the 'me' terminal receives, from the management apparatus 110, a receipt designation report message reporting that a receipt commanding terminal is the 'father' terminal and a call receiving terminal is the 'me' terminal, the 'me' terminal may display that the 'father' terminal commands the 'me' terminal to receive the call, in operation 1020.

The 'me' terminal may transmit, to the management apparatus 110, a receipt designation message designating the 'sister' terminal as a call receiving terminal and may display that the 'me' terminal commands the 'sister' terminal to receive the call, in operation 1030.

Figure 11:
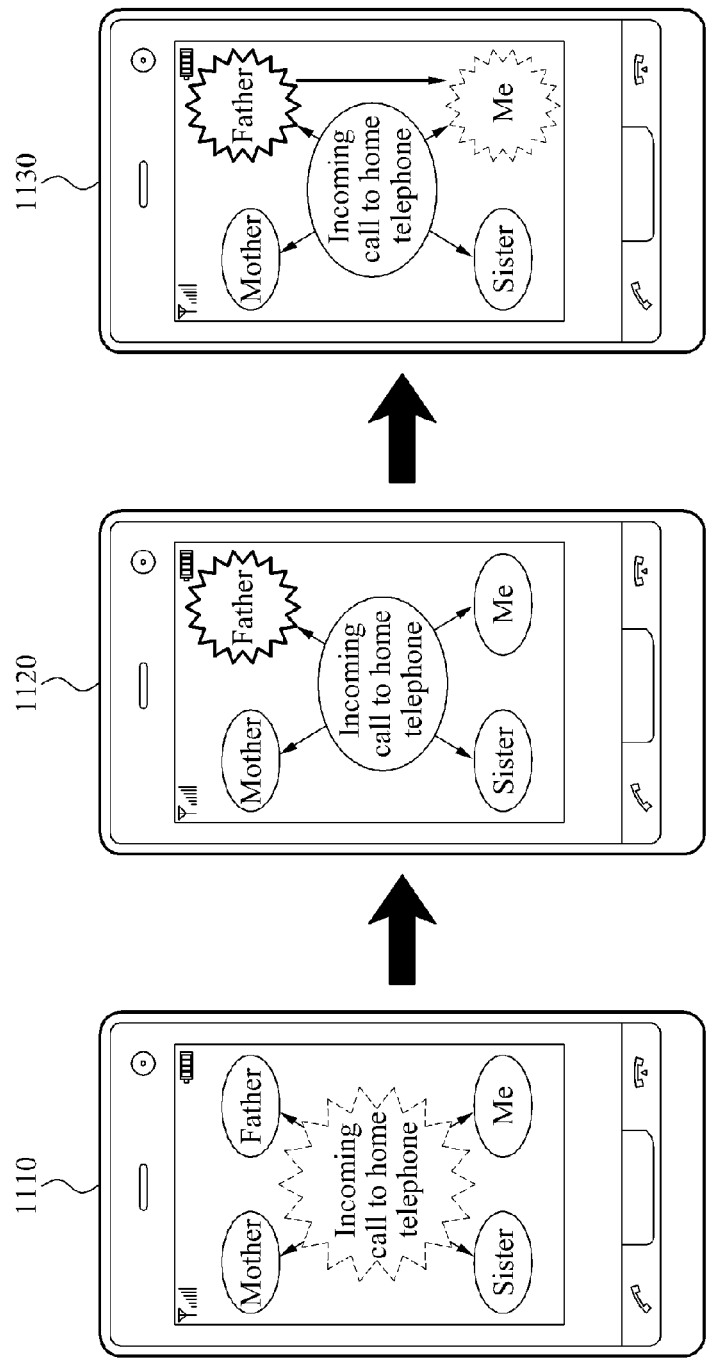
FIG. 11 is a view illustrating an example of call forwarding in the call forwarding system according to an exemplary embodiment of the present invention.

FIG. 11 is a view illustrating an example of call forwarding in the call forwarding system according to an exemplary embodiment of the present invention.

Referring to FIG. 11, if the 'me' terminal receives a call report message from the management apparatus 110, the 'me' terminal may output that a call was received in the reference terminal, the home telephone, along with a terminal list, in operation 1110.

If the 'me' terminal receives, from the management apparatus 110, a receipt report message reporting that the 'father' terminal received the call, the 'me' terminal may display that the call was received in the 'father' terminal, in operation 1120.

If the 'me' terminal receives, from the management apparatus 110, a change report message reporting that a change commanding terminal is the 'father' terminal and a changed call receiving terminal is the 'me' terminal, the 'me' terminal may display that the 'father' terminal requests to change the receipt of the call to the 'me' terminal, in operation 1130.

A service terminal may display a relationship among a reference terminal and service terminals based on the information of the terminal list. Further, call forwarding status information such as call forwarding request information and call forwarding designation information may be displayed on the display unit of a service terminal. In an example, spur gear shaped (dotted line and solid line) icon and arrows may be used as indicators for the call is forwarding status information.

The management apparatus 110 and the reference terminal 120 may be configured as one device. That is, a reference terminal 120 may perform functions of the management apparatus 110. A structure of a call forwarding system including a reference terminal performing functions of a management apparatus is described below with reference to FIG. 12.

Figure 12:
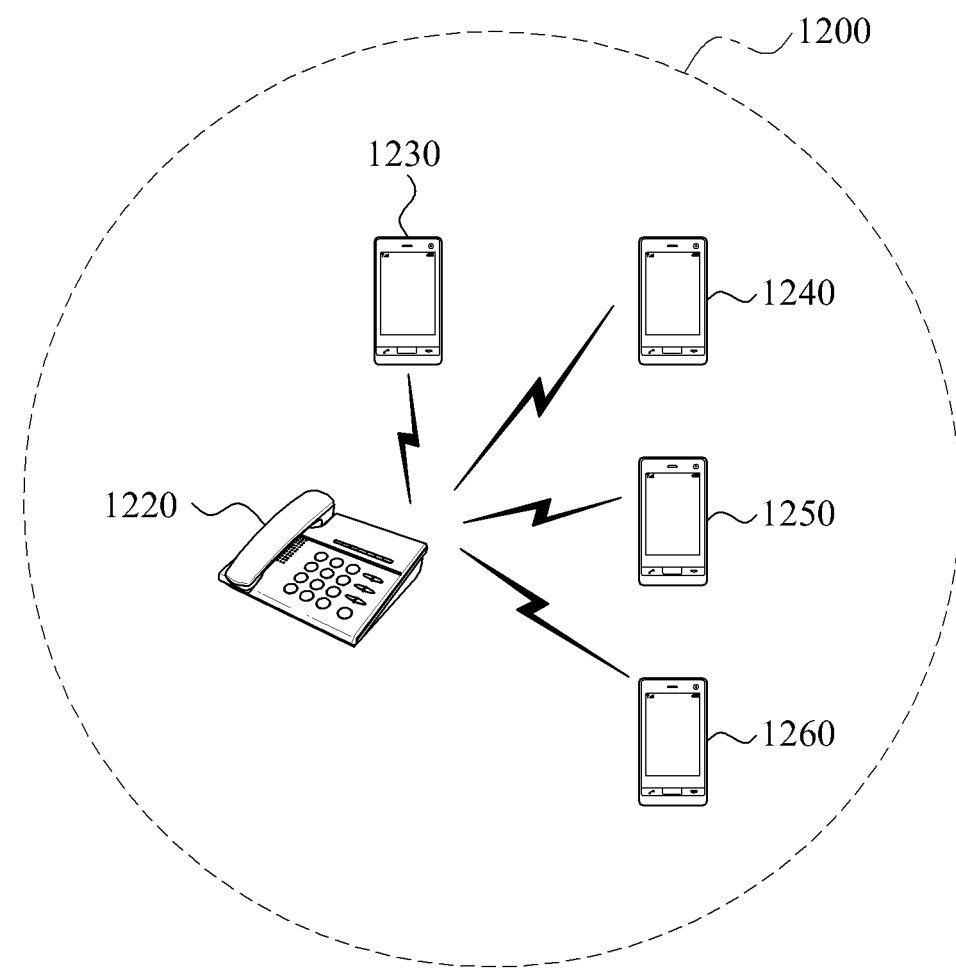
FIG. 12 is a schematic view illustrating a structure of a call forwarding system according to an exemplary embodiment of the present invention.

FIG. 12 is a schematic view illustrating a structure of a call forwarding system 1200 according to an exemplary embodiment of the present invention.

Referring to FIG. 12, the call forwarding system 1200 may include a reference terminal 1220 and service terminals 1230, 1240, 1250, and 1260.

The reference terminal 1220 may be a terminal to provide a call to be forwarded, and may forward a call to one or more of the service terminals 1230, 1240, 1250, and 1260 capable of and within a reception range of near field wireless communication. The reference terminal 1220 may be a wired terminal, for example, a home telephone.

The service terminals 1230, 1240, 1250, and 1260 may receive a call received in the reference terminal 1220 via near field wireless communication and may provide a call service to a user.

The reference terminal 1220 and the service terminals 1230, 1240, 1250, and 1260 are described in more detail below with reference to FIG. 13 and FIG. 14.

Figure 13:
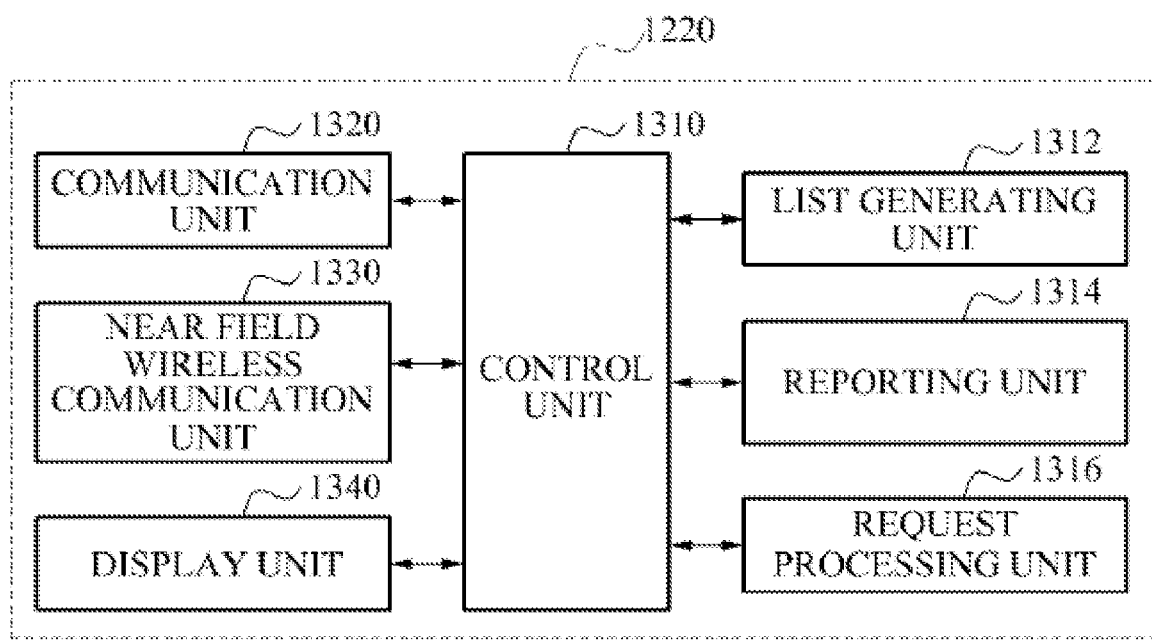
FIG. 13 is a block diagram illustrating a structure of a reference terminal in the call forwarding system according to an exemplary embodiment of the present invention.

FIG. 13 is a block diagram illustrating a structure of the reference terminal 1220 in the call forwarding system 1200 according to an exemplary embodiment of the present invention.

The reference terminal 1220 may be a home telephone capable of wired/wireless communication, or may be one of service terminals capable of near field wireless communication is within a reception range of near field wireless communication.

Referring to FIG. 13, the reference terminal 1220 may include a control unit 1310, a communication unit 1320, a near field wireless communication unit 1330, a display unit 1340, a list generating unit 1312, a reporting unit 1314, and a request processing unit 1316.

The communication unit 1320 may receive a call.

The near field wireless communication unit 1330 may transmit and receive a message including call forwarding information to and from the service terminals 1230, 1240, 1250, and 1260 via near field wireless communication, and may forward a call via near field wireless communication.

The display unit 1340 may display state information or an indicator including predetermined, retrieved, or inputted numbers and characters, a moving picture, and a still picture that may occur during operation of the reference terminal 1220.

The list generating unit 1312 may determine the service terminals 1230, 1240, 1250, and 1260 capable of and within a reception range of near field wireless communication, and may generate a terminal list.

The reporting unit 1314 may transmit a call report message including the terminal list to the service terminals 1230, 1240, 1250, and 1260. The call report message also includes information that the reference terminal 1220 received a call.

If the request processing unit 1316 receives a receipt request message, the request processing unit 1316 may forward the call to a service terminal, which transmitted the receipt request message such as service terminal 1230, via near field wireless communication. If the request processing unit 1316 forwards the call to a service terminal 1230 which transmitted the receipt request message, the reporting unit 1314 may transmit, to the service terminals 1230, 1240, 1250, and 1260, a receipt report message including information of the service terminal 1230 to which the call was forwarded.

If the request processing unit 1316 receives a receipt designation message before receiving the receipt request message, the request processing unit 1316 may determine the service terminal 1230, which transmitted the receipt designation message, as a receipt commanding terminal, and may determine a call receiving terminal to which the call is to be forwarded, by extracting information of the call receiving terminal included in the receipt designation message. Then, the reporting unit 1314 may transmit, to the service terminals 1230, 1240, 1250, and 1260, a receipt designation report message including the information of the receipt commanding terminal and information of the call receiving terminal.

After the call is forwarded to the service terminal 1230 which transmitted the receipt request message, if the request processing unit 1316 receives a receipt change message from the service terminal 1230 to which the call was forwarded, the request processing unit 1316 may determine a changed call receiving terminal to which the call is to be received ("reforwarded"), by extracting information of the changed call receiving terminal included in the receipt change message, and may transmit, to the changed call receiving terminal, a change request message requesting the receipt of the call.

If the request processing unit 1316 receives a change response message from the changed call receiving terminal, the request processing unit 1316 may forward the call to the changed call receiving terminal. Then, the reporting unit 1314 may transmit, to the service terminals 1230, 1240, 1250, and 1260, a change report message reporting that the receipt of the call was changed.

The control unit 1310 may control the entire operation of the reference terminal 1220. Also, the control unit 1310 may perform a portion of or all of the functions of one or more of the list generating unit 1312, the reporting unit 1314, and the request processing unit 1316. The present embodiment separately describes functions of the control unit 1310, the list generating unit 1312, the reporting unit 1314, and the request processing unit 1316. Alternatively, the control unit 1310 may include at least one processor configured to perform a portion of or all of the functions of one or more of the list generating unit 1312, the reporting unit 1314, and the request processing unit 1316.

Figure 14:
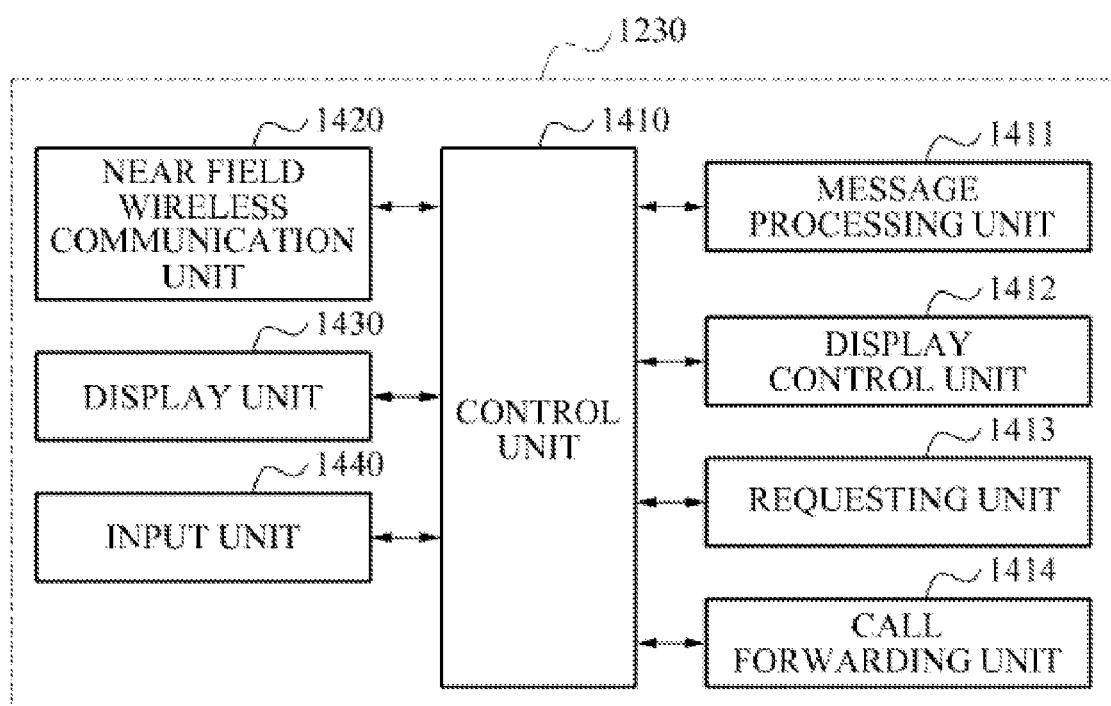
FIG. 14 is a block diagram illustrating a structure of a service terminal in the call forwarding system according to an exemplary embodiment of the present invention.

FIG. 14 is a block diagram illustrating a structure of the service terminal 1230 in the call forwarding system 1200 according to an exemplary embodiment of the present invention.

As shown in FIG. 14, the service terminal 1230 may include a control unit 1410, a near field wireless communication unit 1420, a display unit 1430, an input unit 1440, a message processing unit 1411, a display control unit 1412, a requesting unit 1413, and a call forwarding unit 1414.

The near field wireless communication unit 1420 may transmit and receive a message including call forwarding information to and from the reference terminal 1220 via near field wireless communication, and may receive a call via near field wireless communication.

The display unit 1430 may display state information or an indicator, including predetermined, retrieved, or inputted numbers and characters, a moving picture, and a still picture that may occur during operation of the service terminal 1230. The display unit 1430 may output information occurring during call forwarding based on the control of the display control unit 1412.

The input unit 1440 may receive an input of a user of the service terminal 1230 and may provide the input to the control unit 1410. The input unit 1440 may be configured in is the type of a key pad or a touch screen. The input unit 1440 may receive an input such as a call receipt commanding input, a call receiving input, and a call receiving terminal changing input.

The message processing unit 1411 may extract information included in messages received from the reference terminal 1220.

If the message processing unit 1411 receives a call report message from the reference terminal 1220, the message processing unit 411 may extract a terminal list included in the call report message.

If the message processing unit 1411 receives a receipt report message from the reference terminal 1220, the message processing unit 411 may extract information of a terminal which received the call.

If the message processing unit 1411 receives a change report message from the reference terminal 1220, the message processing unit 1411 may extract information of a terminal which received the call changed in receipt.

If the message processing unit 1411 receives a receipt designation report message from the reference terminal 1220, the message processing unit 1411 may extract information of a receipt commanding terminal and information of a call receiving terminal included in the receipt designation report message.

The display control unit 1412 may control the display unit 1430 to display information extracted by the message processing unit 1411.

The requesting unit 1413 may transmit, to the reference terminal 1220, a request corresponding to an input inputted into the input unit 1410.

If the input unit 1440 receives an input and determines the input as a call receipt commanding input, the requesting unit 1413 may extract information of a call receiving terminal is to which the call is to be forwarded, and may transmit a receipt designation message including the information of the call receiving terminal to the reference terminal 1220.

If the input unit 1440 receives an input and determines the input as a call receiving input, the requesting unit 1413 may transmit, to the reference terminal 1220, a receipt request message reporting that the service terminal 1230 will receive the call.

After the requesting unit 1413 transmits the receipt request message to the reference terminal 1220, the call forwarding unit 1414 may receive the call initially received by the reference terminal 1220 via near field wireless communication.

After the call is received ("forwarded"), if the input unit 1440 receives an input and determines the input as a call receiving terminal changing input, the requesting unit 1413 may extract information of a changed call receiving terminal to which the call is to be received ("reforwarded") and may transmit, to the reference terminal 1220, a receipt change message including the information of the changed call receiving terminal.

The control unit 1410 may control the entire operation of the service terminal 1230. Also, the control unit 1410 may perform a portion of or all functions of one or more of the message processing unit 1411, the display control unit 1412, the requesting unit 1413, and the call forwarding unit 1414.

The present embodiment separately describes functions of the control unit 1410, the message processing unit 1411, the display control unit 1412, the requesting unit 1413, and the call forwarding unit 1414. Alternatively, the control unit 1410 may include at least one processor configured to perform a portion of or all functions of one or more of the message processing unit 1411, the display control unit 1412, the requesting unit 1413, and the call forwarding unit 1414.

Further, exemplary embodiments of the invention may provide a call forwarding is network including multiple terminals. The call forwarding network may include multiple terminals capable of near field wireless communication and the multiple terminals may share a terminal list. The multiple terminals may be capable of serving as both a reference terminal and a service terminal. If a terminal in the call forwarding network initially receives a call, the terminal which received the initial call may serve as a reference terminal and the other terminals included in the terminal list of the reference terminal may serve as service terminals. Further, for enhanced security, the reference terminal may transmit the terminal list and call forwarding information to the authenticated terminals. The authenticated terminals may be registered terminals. Alternatively, the reference terminal may request terminal information of a terminal and perform authentication of the terminal based on the terminal information of the terminal after receiving the terminal information.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level is code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to provide a call forwarding, comprising:
a near field wireless communication unit to receive a message including call forwarding information via near field wireless communication if a call is received by a different terminal;
a message processing unit to extract call information included in the message; and
a display control unit to control a display relating to the call forwarding information and a display of a terminal list, the terminal list comprising a plurality of terminals connected via near field wireless communication and capable of receiving the call.

2. The terminal of claim 1, wherein the message further includes the terminal list.

3. The terminal of claim 2, wherein the message processing unit extracts the terminal list included in the message.

4. The terminal of claim 2, wherein the message processing unit extracts at least one of the call information and the terminal list included in the message if the message processing unit receives the message including information that a call was received by the different terminal.

5. The terminal of claim 2, wherein the terminal list includes information of a terminal to receive a forwarded call.

6. The terminal of claim 1, wherein the near field wireless communication unit transmits the message via near field wireless communication.

7. A method performed by a first terminal to provide a call forwarding, the method comprising:
receiving a message from a second terminal via near field wireless communication, the message including information of a receipt of a call;
extracting call information included in the message; and
displaying call forwarding information and a terminal list on a display unit of the first terminal, the call forwarding information being based on the call information, and the terminal list comprising a plurality of terminals connected via near field wireless communication and capable of receiving the call.

8. The method of claim 7, wherein the message further includes the terminal list.

9. The method of claim 8, wherein the terminal list includes information of a terminal to receive a forwarded call.

10. The method of claim 8, further comprising: displaying the information of the terminal to receive a forwarded call.

11. The method of claim 7, further comprising transmitting a receipt request message to the second terminal if the first terminal receives a call receiving input.

12. The method of claim 7, further comprising receiving the call of the second terminal via near field wireless communication.

13. The method of claim 7, further comprising:
transmitting, to the second terminal, a receipt request message including information that the first terminal will receive the call; and
receiving at the first terminal the call of the second terminal.

14. The method of claim 7, further comprising transmitting the message to a third terminal via near field wireless communication.

15. A first terminal to provide a call forwarding, comprising:
a near field wireless communication unit to receive a message including call forwarding information via near field wireless communication, the call forwarding information indicating a call received by a second terminal located in a communication range of near field wireless communication; and
a display control unit to control a display relating to the call forwarding information and a display of a terminal list, the terminal list comprising a plurality of terminals connected via near field wireless communication and capable of receiving the call.

16. The first terminal of claim 15, wherein the display control unit displays a call forwarding status.

17. The first terminal of claim 16, wherein the call forwarding status includes a call forwarding designation from a third terminal to the first terminal.

18. The first terminal of claim 17, wherein the third terminal is located in a communication range of near field wireless communication.

19. The first terminal of claim 16, wherein the call forwarding status includes a call forwarding designation from the second terminal to the first terminal.

* * * * *